(12) United States Patent
Hovell et al.

(10) Patent No.: US 6,871,177 B1
(45) Date of Patent: Mar. 22, 2005

(54) PATTERN RECOGNITION WITH CRITERION FOR OUTPUT FROM SELECTED MODEL TO TRIGGER SUCCEEDING MODELS

(75) Inventors: Simon A Hovell, Cambridge (GB); Mark Wright, Norwich (GB); Simon P. A Ringland, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/529,384

(22) PCT Filed: Oct. 27, 1998

(86) PCT No.: PCT/GB98/03207

§ 371 (c)(1),
(2), (4) Date: Apr. 13, 2000

(87) PCT Pub. No.: WO99/23640

PCT Pub. Date: May 14, 1999

(30) Foreign Application Priority Data

Nov. 3, 1997 (GB) .............................................. 9723214

(51) Int. Cl.[7] .............................................. G10L 15/14
(52) U.S. Cl. ...................................... 704/256; 704/231
(58) Field of Search ................................ 704/257, 255, 704/256, 231

(56) References Cited

U.S. PATENT DOCUMENTS 4,601,057 A * 7/1986 Tsuji et al. .................. 382/172
4,718,092 A * 1/1988 Klovstad ..................... 704/239
5,479,489 A * 12/1995 O'Brien ................... 379/88.03
6,163,768 A * 12/2000 Sherwood et al. .......... 704/235
6,278,973 B1 * 8/2001 Chung et al. ............... 704/257

FOREIGN PATENT DOCUMENTS

EP          0 392 728          10/1990
WO          96/27872           9/1996

OTHER PUBLICATIONS

Lucke, "Bayesian Belief Networks as a Tool for Stochastic Parsing", Speech Communication vol. 16, No. 1, Jan. 1, 1995, pp. 89–118, XP–004014230.

(List continued on next page.)

*Primary Examiner*—Richemond Dorvil
*Assistant Examiner*—Donald L. Storm
(74) *Attorney, Agent, or Firm*—Nixon & Vanderhye P.C.

(57) ABSTRACT

A method and apparatus of recognizing a pattern comprising a sequence of sub-patterns includes a set of possible patterns being modelled by a network of sub-pattern models. One or more initial software model objects are instantiated first. As these models produce outputs, succeeding model objects are instantiated if they have not already been instantiated. However, the succeeding model objects are only instantiated if a triggering model output meets a predetermined criterion. This ensures that the processing required is maintained at a manageable level. If the models comprise finite state networks, pruning of internal states may also be performed. The criterion applied to this pruning is less harsh than that applied when determining whether to instantiate a succeeding model.

22 Claims, 9 Drawing Sheets

OTHER PUBLICATIONS

Artzy et al., "The Theory, Design, Implementation and Evaluation of a Three–Dimensional Surface Detection Algorithm", Proceedings of Siggraph 1980–Seventh Annual Conference on Computer Graphics and Interactive Techniques, vol. 14, No. 3, Jul. 1980, pp. 2–9, XP–002086849.

Dong et al., "Design of a Partially Activated Neural Network", IEEE International Conference on Neural Networks Proceedings, vol. 3, Nov. 27, 1995–Dec. 1, 1995, pp. 1282–1286, XP–002086850.

Artzy et al., "The Theory Design, Implementation and Evaluation of a Three–Dimensional Surface Detection Algorithm", Proceedings of Siggraph 1980–Seventh Annual Conference on Computer Graphics and Interactive Techniques, Inspec No. 1613679, XP–002052107.

Dong et al., "Design of a Partially Activated Neural Network", 1995 IEEE International Conference on Neural Networks Proceedings, vol. 3, Nov. 27,1995–Dec. 1, 1995, Inspec No. 5256919, XP–002052106.

* cited by examiner

PATTERN RECOGNITION WITH CRITERION FOR OUTPUT FROM SELECTED MODEL TO TRIGGER SUCCEEDING MODELS

BACKGROUND

1. Field

The present invention relates to pattern recognition.

2. Description of Related Art

One of the classic pattern recognition problems is that of speech recognition. Speech recognition is complicated by the fact that no two people say a word in the same way and indeed the same person may vary the way in which they pronounce the same word. To overcome this problem, models have been developed which allow for this to variability.

One form of model represents a word, phoneme or some other element of speech as a finite state network. For the purpose of recognition, speech is represented by sequences of vectors. Each vector comprises a plurality of parameters of the acoustic signal during a particular period. These parameters typically include energy levels in different frequency bands and time differential energy levels in the frequency bands.

To form the model, vector sequences representing many people saying the same word, phoneme etc. are analysed and, in the case of Hidden Markov Models, a set of probability density functions is generated. The probability density functions indicate the likelihood of an input vector corresponding to a given state. Each state is linked to the following state if any and recursively to itself. These links have associated with them costs or probabilities representing the likelihood of a particular transition between states or a particular non-transition occurring in a vector sequence for the speech of a person saying the word modelled.

The finite state network can be represented as a grid, each node of which represents a unique combination of state and time. During recognition, the similarity between an input vector and nodes of the grid are allotted costs or probabilities depending on the method used. The transitions between nodes are allotted costs or probabilities during creation of the model. The application of an input vector sequence to a model can be viewed as creating a set of tokens that move through the grid, with the best token arriving at each node surviving. Eventually, tokens will emerge from the grid and their values can be compared with others emerging from the same grid and those emerging from the grids of other models to identify the input spoken word.

A more detailed description of token passing can be found in Young, S. J. et al., "Token Passing: a Simple Conceptual Model for Connected Speech Recognition Systems", Cambridge University Engineering Department, Technical Report CUED/F-INFENG/TR38, Jul. 31, 1989.

It will be appreciated that continuous speech may be recognised by applying the tokens output from a first set of models and input speech vectors to a second set of models. However, a problem arises in that the second set of models must be instantiated for each token emerging from the first set of models.

Considering for example a system for recognising a seven-digit telephone number, the set of models must contain models for "one", "two", "three" etc. and three variants of 0, i.e. "zero", "nought" and "oh". Thus, each set contains twelve models and therefore the number of models instantiated would total 39,071,244. Working with this many model instances is clearly an enormous task.

The models need not represent whole words and may represent phonemes or some other subword unit. In this case, differentiating between words beginning with the same sounds is analogous to differentiating between different sequences of words all beginning with the same word.

BRIEF SUMMARY

It is an aim of the present invention to ameliorate the aforementioned problem both where a token passing approach is taken and more generally.

According to the present invention, there is provided a method of recognising a pattern comprising a sequence of sub-patterns, the method comprising: generating a data sequence representative of a physical entity; applying the data sequence to a set comprising active models in a network of models including at least one model; selecting a subset of the outputs of the members of said set according to a predetermined criterion; and adding further models to said set in dependence on the members of said subset, wherein each model represents a sub-pattern and in use outputs an indication of the degree of matching between an input data sub-sequence and the represented sub-pattern, and the further models take the associated subset members as inputs.

According to the present invention, there is also provided a pattern recognition apparatus for recognising a pattern comprising a sequence of subpatterns, the apparatus comprising: means for generating a data sequence representative of a physical entity; means for applying the data sequence to a set comprising active models in a network of models including at least one model; means for selecting a subset of the outputs of the members of said set according to a predetermined criterion; and means for adding further models to said set in dependence on the members of said subset, wherein each model represents a sub-pattern and in use outputs an indication of the degree of matching between an input data sub-sequence and the represented sub-pattern, and the further models take the associated subset members as inputs.

Consequently, the present invention makes practical automated pattern recognition using hardware less sophisticated than that demanded by the prior art and increases the capabilities of prior art hardware.

Preferably, new models are only instantiated if the set does not already include the necessary model.

Preferably, in the case of a token passing embodiment, the pruning of the outputs of the models is in addition to the competition between tokens at exit states described in Young, S. J. et al., "Token Passing: a Simple Conceptual Model for Connected Speech Recognition Systems".

The nature of the models themselves is not of critical importance. They may be, for instance, neural networks. However, if finite state models are used, it is preferable that pruning be carried out between the application of successive data elements of said sequence to the network. This pruning preferably comprises assessing values at each state of the models of the network and deactivating those states that do not meet a predetermined criterion. In this case, the set of models is advantageously dynamic and pruning removes models when all of their states have been deactivated.

Preferably, the criterion applied to the model outputs is harsher than the criterion applied to states within a model.

Preferably, the application of the criterion applied to model outputs comprises creating a histogram of output states on the basis of their values and selecting those states in the bins of the histogram which contain the states having the best m values, where m is an integer. Preferably also, the application of the criterion applied to all model states comprises creating a histogram of states on the basis of their values and selecting those states in the bins of the histogram which contain the states having the best n values, where n is an integer, for deactivation. In this way the growth of the number of instantiated models can be predicted and the time taken for the processing is prevented from becoming excessive.

The present invention is particularly applicable to speech recognition. In a speech recognition apparatus according to the present invention, the data generation means preferably comprises feature extraction means for extracting characterising features from an audio signal.

Advantageously, the models are of vocalisations generally less than complete words.

In this way, the number of different models required can be reduced where a large vocabulary is to be recognised.

A speech recognition apparatus according to the present invention may be used to provide speech responsiveness to an apparatus. Preferably, such an apparatus includes a speech synthesizer and processing means, wherein the processing means is responsive to the output of the speech recognition apparatus to select message data and drive the speech synthesizer according to the selected message data to generate an audio message. With apparatus of this kind, the apparatus may enter into a dialogue with a user. An example of such an application would be the control of a telephone switching centre. By this means, a user could dial a telephone number verbally.

According to the present invention, there is further provided a method of operating a computer so as to recognise a pattern comprising a sequence of sub-patterns, the method comprising: generating a data sequence representative of a physical entity; applying the data sequence to a set comprising active models in a network of models including at least one model; selecting a subset of the outputs of the members of said set according to a predetermined criterion; and adding further models to said set in dependence on the members of said subset to thereby reduce the time required to recognise said pattern, wherein each model represents a sub-pattern and in use outputs an indication of the degree of matching between an input data sub-sequence and the represented subpattern, and the further models take the associated subset members as inputs. Clearly, such a method provides a technical effect in that the recognition is performed more quickly than would otherwise be the case. The alternative would be to increase the clock speed of the computer. However, this would provide only a limited reduction in the recognition processing time and the degree by which the clock speed can be increased varies from computer to computer. Increasing the clock speed also has the disadvantage of potentially reducing the useful life of the computer because the computer will tend to run hot.

DESCRIPTION OF DRAWINGS

Embodiments of the present invention will now be described, by way of example, with reference to the accompanying drawings, in which:—

DETAILED DESCRIPTION OF EXEMPLARY EMBODIMENTS

In the following description, the International Phonetic Alphabet will be employed so that the ambiguities of English orthography can be avoided. International Phonetic Alphabet characters are italicised for clarity. The pronunciations are those common to educated British English speech.

Figure 1:
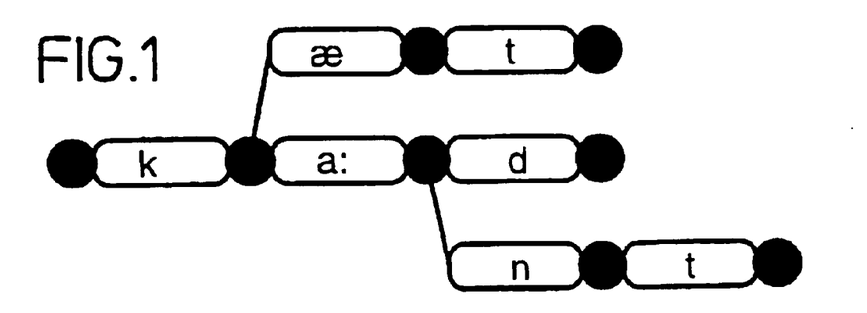
FIG. 1 shows a network for discriminating between the English words "cat", "card" and "can't"

Referring to FIG. 1, each of the words "cat", "card" and "can't" begin with k. After k it can be seen that the network branches because "cat" has the vowel sound æwhereas "card" and "can't" share the vowel sound a:. The network branches again after a: to reflect the different terminal consonants of "card" and "can't", i.e. d and n+t.

Figure 2:
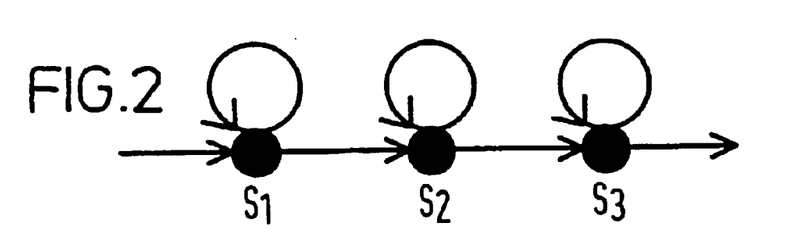
FIG. 2 illustrates a three-state Hidden Markov Model.
Figure 3:
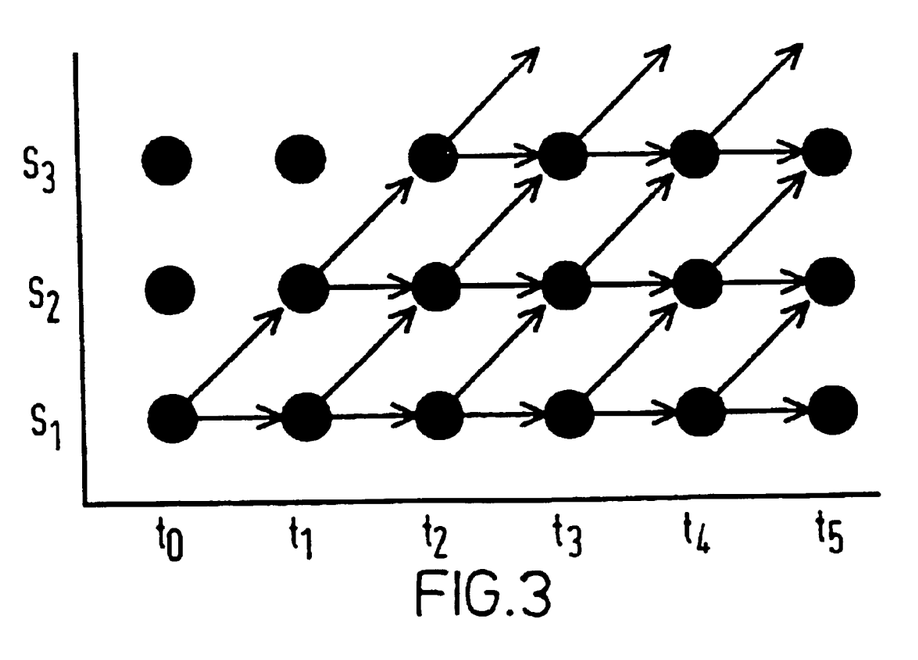
FIG. 3 shows the model of FIG. 2 in state/time space.

Each of the sounds k, æ, a:, d, n and t, are modelled using three-state Hidden Markov models of the form shown in FIG. 2. The hidden Markov models can also be viewed as grids, each node of which representing a different state/time combination, as shown in FIG. 3. Each of the transitions between state/time nodes of the grid are allocated a probability during training of the network. This training process is well-known in the art.

Each of the models is implemented as an instance an appropriate model software object. Conveniently, the models for the different sounds are polymorphic descendants of the same base class.

Each of the states is also implemented as an instance of a software object. The properties of the states include the parameters of the probability density functions used for evaluating the match of an input vectors to the state's vector at different times, the identity of states from which transitions can occur, the parameters of the probability density functions associated with each of those transitions and for the case of a non-transition, and new and old token properties. The meaning of the new and old token properties will become clear from the following description.

Within a model object, the state objects are held in a one-dimensional array.

When the model is instantiated, the new and old token properties all of the states are set to $-\infty$. In practice the most negative number that can be handled by the computer is allocated to the new and old token properties of each node of the grid.

Once the model has been instantiated, a sequence of vectors $V_0, \ldots, V_5$ is sequentially applied to the model at respective times $t_0 \ldots, t_5$. When a vector is applied to the model, it is multiplied by the probability density function applicable at the current time $t_n$, defined by the state objects, for the currently permitted states and the result is stored in the new token properties of the states. Referring to FIG. 2, it can be seen that states $S_2$ and $S_3$ are not permitted at time $t_0$ and that state $S_3$ is not permitted at time $t_1$. Next, for each state whose new token property does not equal $-\infty$, the incoming token values are determined. That is, for each state to the left of the present state, and for the present state for which the model permits a transition to the present state FIG.

2), the old token property (if not itself −∞ is multiplied by the transition probability density function specified in the state model. The largest of these is determined and multiplied by the new token property for the subject state, the result being stored in the new token property.

When all the new token values have been determined, the new token properties are copied into the old token properties. A histogram of the old token properties is then constructed and the states in the bins containing the n largest values greater than −∞ are identified, where n is an integer chosen empirically. It will be appreciated that initially at least there will be less than n states with token properties greater than −∞. All the states, other than those in the identified bins, have their old token properties set to −∞. Consequently, at any time, only the best states will affect the state of the model in the succeeding iteration; the others having been pruned. Put another way, only the best tokens survive to propagate to the next column of the grid.

If the time is not greater than $t_5$, a further iteration is carried out. A match between the modelled word and the input speech is determined on the basis of the values of the tokens exiting state $S_3$ of the model.

The extension of the above method to the network of FIG. 1 will now be described.

From time $t_3$ the k model begins to output tokens. An æ: and an a: model could be instantiated for each token output by the k model. However, this leads to a rapid increase in the number of active models. This is ameliorated to a degree by adding instances of models to a list and constructing the histogram referred to above using the old token properties for all the states in the active models. Thus, once the list contains more than one model instance, the pruning step described above can be followed by removing from the list any model instances whose old token properties are at that time all −∞.

This problem is further ameliorated by building a further histogram immediately after the aforementioned pruning step. This second histogram is constructed using only the exit tokens, i.e. the old token properties of the $S_3$ states of the active models.

From this histogram, the tokens in the bins containing the m largest non −∞ exit tokens are identified and new models instances are only created in respect of the identified exit tokens, assuming that is that the necessary model has not already been instantiated. m is an integer chosen empirically and is less than n.

Figure 4:
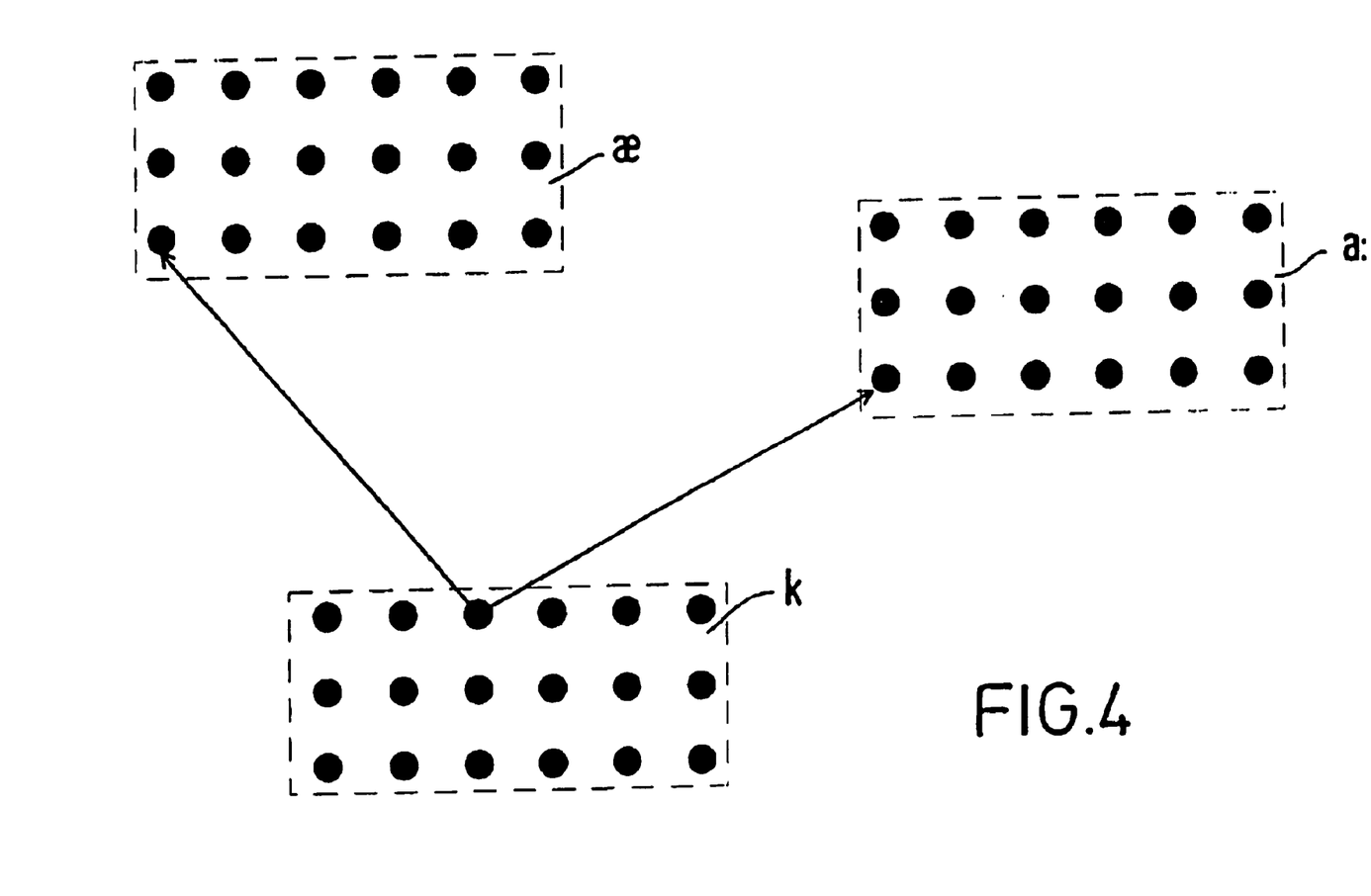
FIG. 4 shows the relationship between a first model instance and the model instances dependent thereon, each of the model instances having a plurality of states.

By way of illustration, FIG. 4 shows the instantiation of models. Each model instantiation in response to exit tokens from the k model has a plurality of states.

Figure 5:
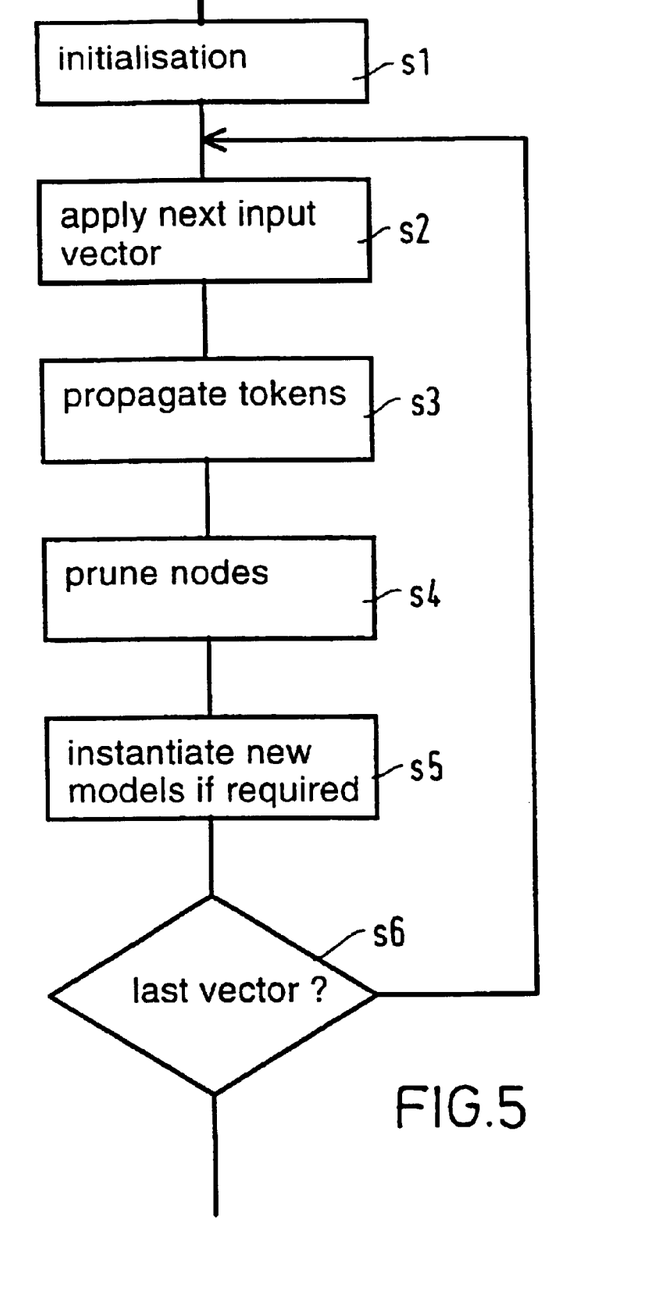
FIG. 5 to 8 are a flow diagrams illustrating a method according to the present invention.

Thus, referring to FIG. 5, the exemplary method comprises initialising a network (step s1), including instantiating one or more initial models and creating a list of model instances. Then repeatedly applying an input vector to the network (step s2), propagating tokens through the or each model (step s3), pruning the states of the models (step s4) and instantiating new models in response to exit tokens (step s5), until the last vector has been input (step s6). Step s2 comprises, for each model instance multiplying the appropriate probability density functions for the permitted states by the input vector and storing the result in the new token properties of the relevant state instances.

Figure 6:
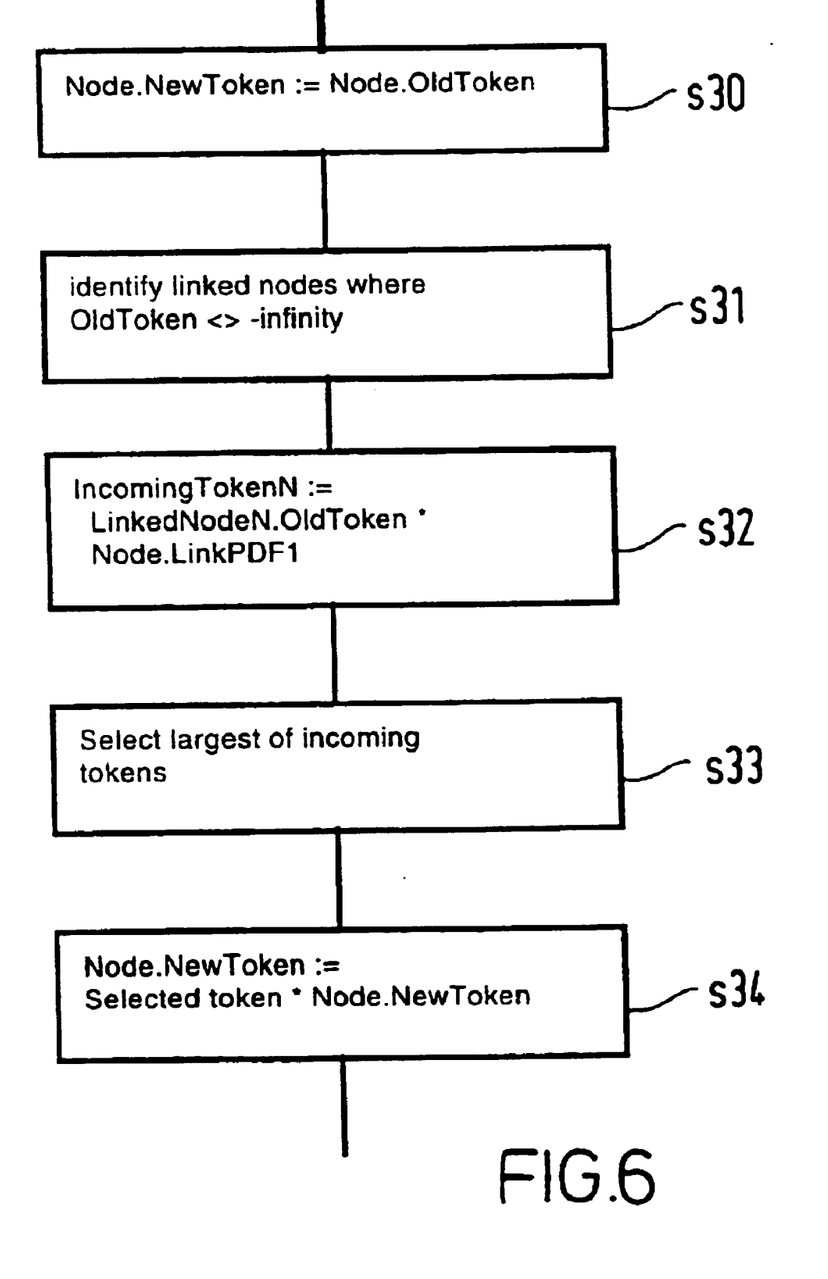

Referring to FIG. 6, step s3 comprises, for each state of each model instance, copying the old token property to the new token property (step s30), identifying the states with links to the current state (including itself and the possibly the $S_3$ state in any preceding model) that have old token properties greater than −∞ (step s31), multiplying the old token properties of the identified states by the link probability density function (step s32), selecting the largest of the token-link probability products (step s33) and multiplying the new token property by the selected product and storing it in the new token property (step s34).

Figure 7:
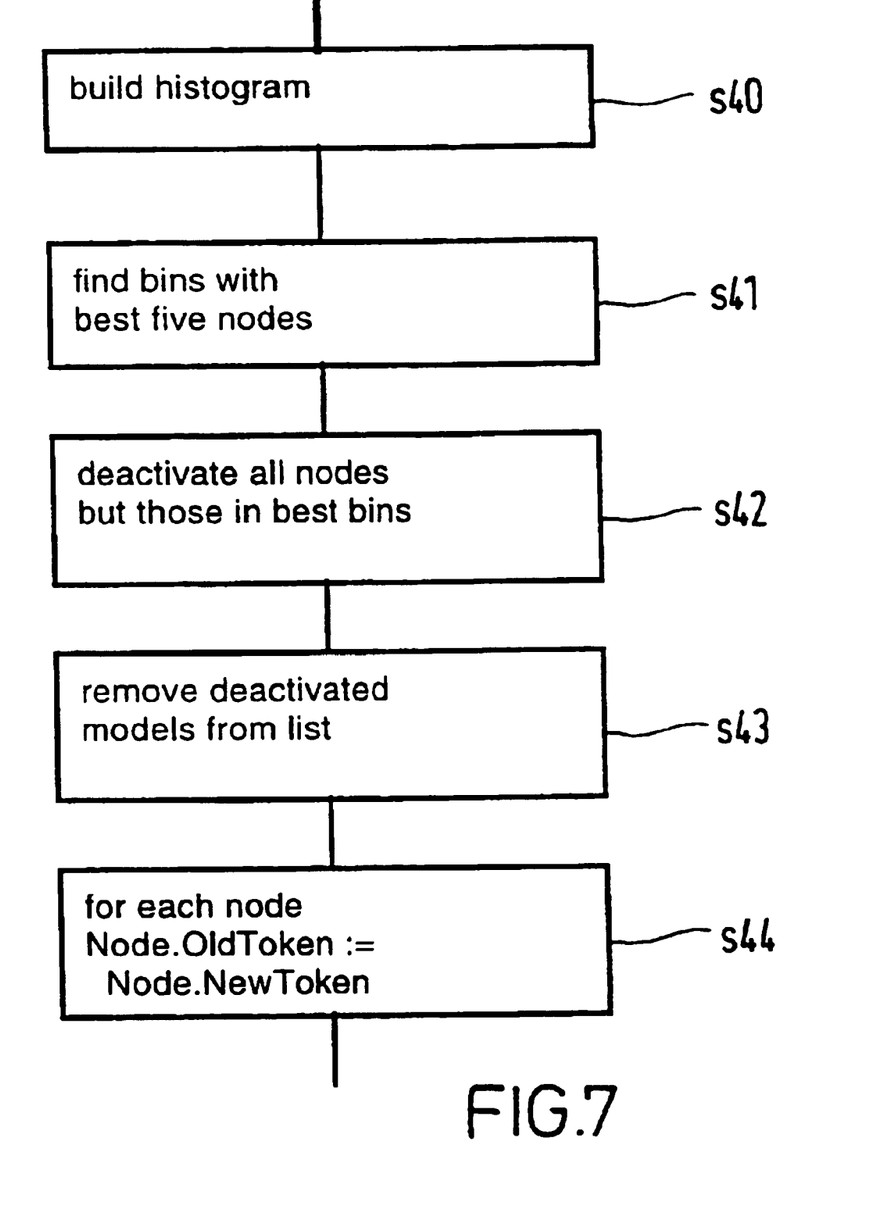

Referring to FIG. 7, step s4 comprises building a histogram of the new token properties of all of the states in the network where the new token property is greater than −∞ (step s40), identifying the bins of the histogram containing the best five nodes (step s41), setting the new token value of all nodes save those in the bins identified in step s41 to −∞ (step s42), removing models from the list where the new token properties of all states therein are −∞ (step s43) and, for all states in the network, copying the new token property to the old token property (step s44).

Figure 8:
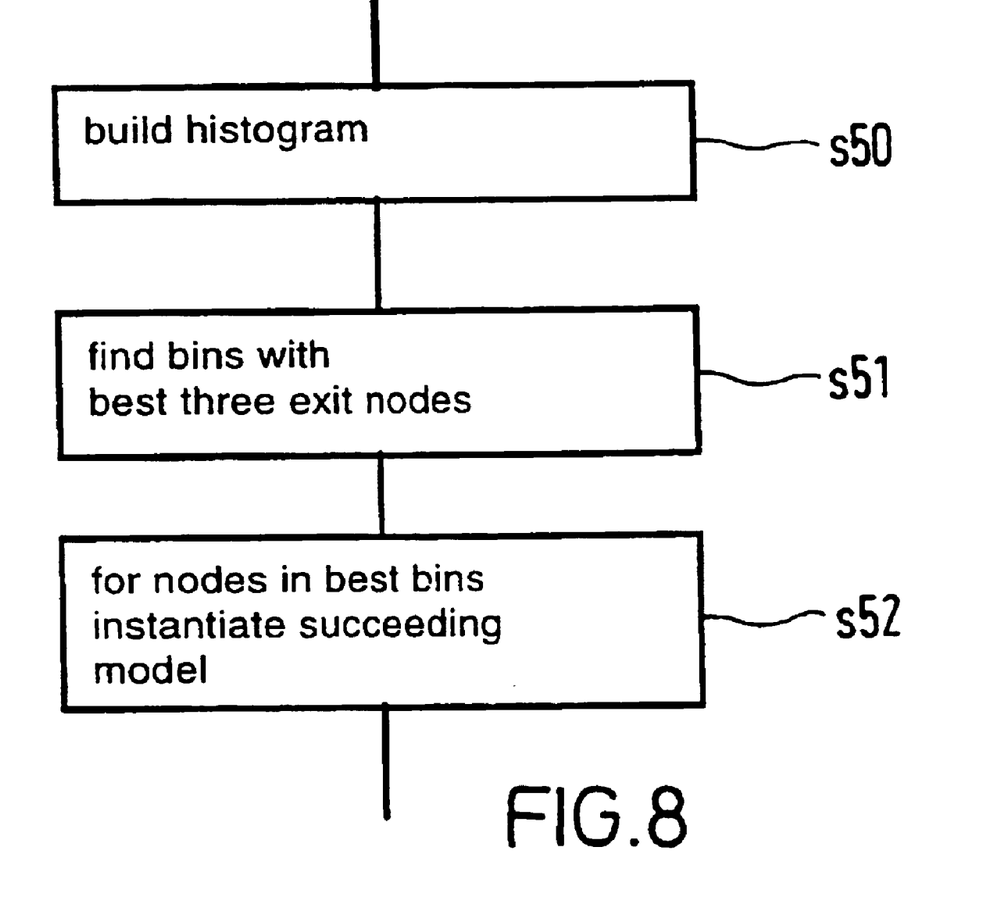

Referring to FIG. 8, step s5 comprises building a histogram of the new token properties for all $S_3$ states (step s50), identifying the bins of the histogram containing the best three state $S_3$ state tokens (s51) and instantiating a succeeding model in respect of $S_3$ states in the identified bins and adding them to the list if the necessary model is not already in the list (step s52). Models will need to be instantiated if they have not already been instantiated or if they have been instantiated and then destroyed in step s43. It should be noted that the identity of a model includes its position in the network. Thus, the two t models in FIG. 1 are not equivalent. That is, the t model following the n model will be instantiated even if an instance of the t model following the æ model exists.

The application of the method explained above in a useful apparatus will now be described.

Figure 9:
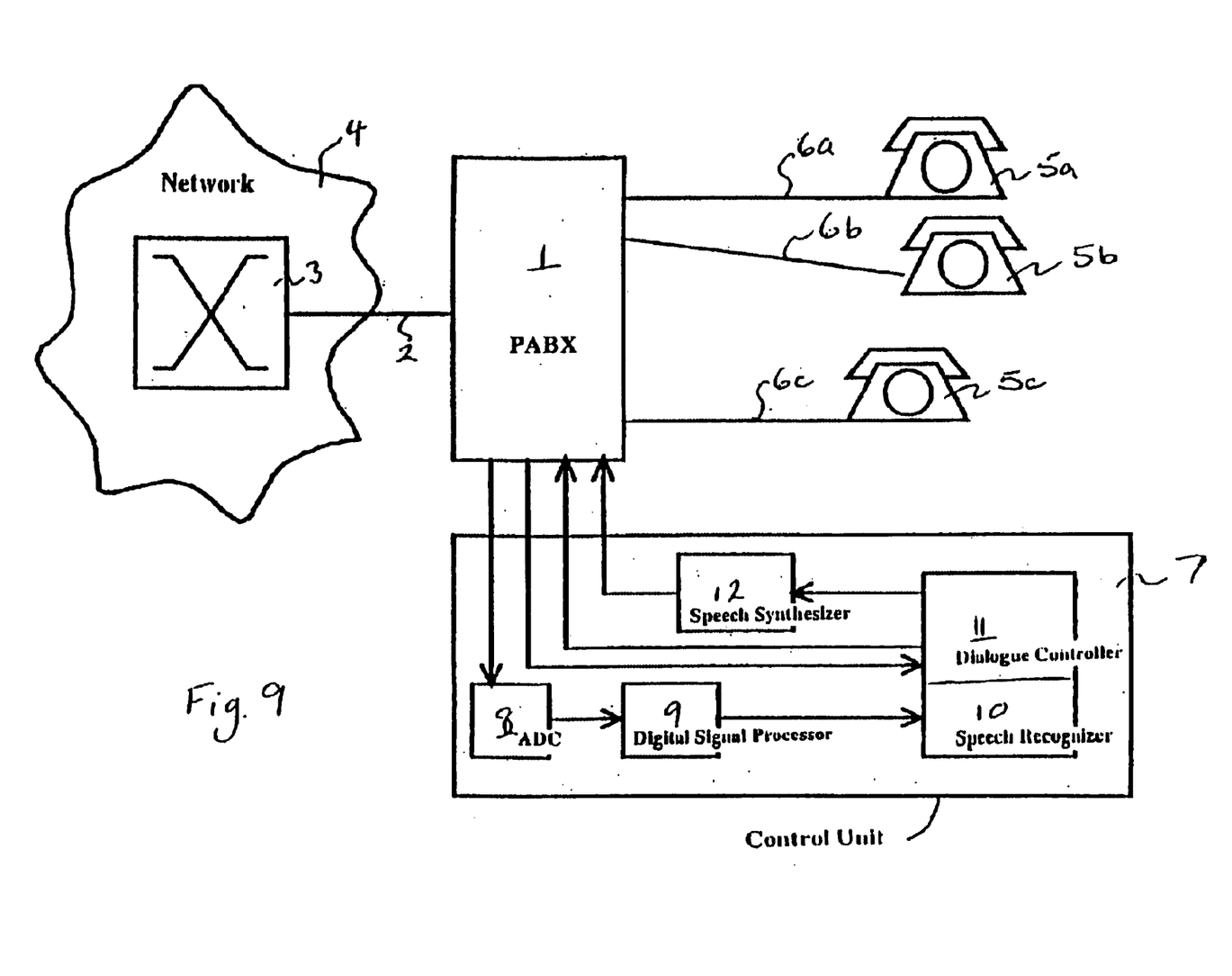
FIG. 9 is a block diagram of an apparatus employing the present invention.

Referring to FIG. 9, an apparatus for voice controlled routing of calls to extensions comprises a private branch exchange (PABX) 1 connected by a subscriber line 2 to a switching centre 3 in the public switched telephone network 4. The PABX 1 is operable to connect the subscriber line 3 to any one of a plurality of telephones 5a, 5b, 5c via respective extension lines 6a, 6b, 6c. The operation of the PABX 1 is controlled by a control unit 7.

The control unit 7 comprises an analogue-to-digital converter (ADC) 8 for digitising analogue speech signals received via the subscriber line 2 and the PABX 1, a digital signal processor 9 for processing the output of the ADC 8, a speech recogniser 10 for recognising speech from signals output by the digital signal processor 9, a dialogue controller 11 for controlling the speech recogniser 10 and the PABX 1, and a speech synthesiser 12 responsive to signals from the dialogue controller 11 to generate analogue speech signals and supply them to the PABX 1 for transmission via the subscriber line 2.

The digital signal processor 9 operates to produce a sequence of feature vectors or frames. In the digital signal processor 9, the speech signal samples from the ADC 8 are first assembled and windowed into overlapping frames. The overlap period is usually chosen to be in the range 10 to 20 ms during which speech is assumed to be quasi-stationary. A fast Fourier transform (FFT) is used to calculate the power spectrum.

The power spectrum is then organised into frequency bands according to a series of Mel scale filters. These filters are spaced linearly to 1 kHz and then logarithmically up to the maximum frequency. The spacing of these bands is based on measurements of the sensitivity of the human ear to changes in frequency. In this way, the power spectrum can be represented by about 20 Mel scale filter outputs.

The dynamic range of the power spectrum is quite large and hence the logarithm is taken of the Mel filter outputs. This accords with human perception of sound intensity which is thought to vary with the logarithm of intensity.

Finally, a discrete cosine transformation (DCT) is performed on the logs of the Mel filter outputs. This is given as:

$$C(k) = \sum_{i=0}^{N-1} f(i)\cos\left(\frac{(i+0.5)k\pi}{N}\right) k\epsilon[0, M]$$

where C(k) is the kth DCT output and f(i) is the ith of N log filter outputs. Two important functions are served by this transform. First, it acts as a data reduction stage. The power spectrum envelope varies slowly over the frequency range and so M is usually much less than N. Secondly, the DCT outputs are relatively uncorrelated so that each output value can be assumed to be independent of every other value.

Each feature vector contains a subset of coefficients. In addition, the time derivative of the coefficients computed over successive, non-overlapping frames is often included. Similarly, the differential logarithm of frame energies is also included.

Thus, the final feature vector consists of:

$$V_t = \begin{bmatrix} C(0) \\ \ldots \\ C(M) \\ \Delta C(0) \\ \ldots \\ \Delta C(M) \\ \text{Log energy} \\ \Delta \text{Log energy} \end{bmatrix}$$

Figure 10:
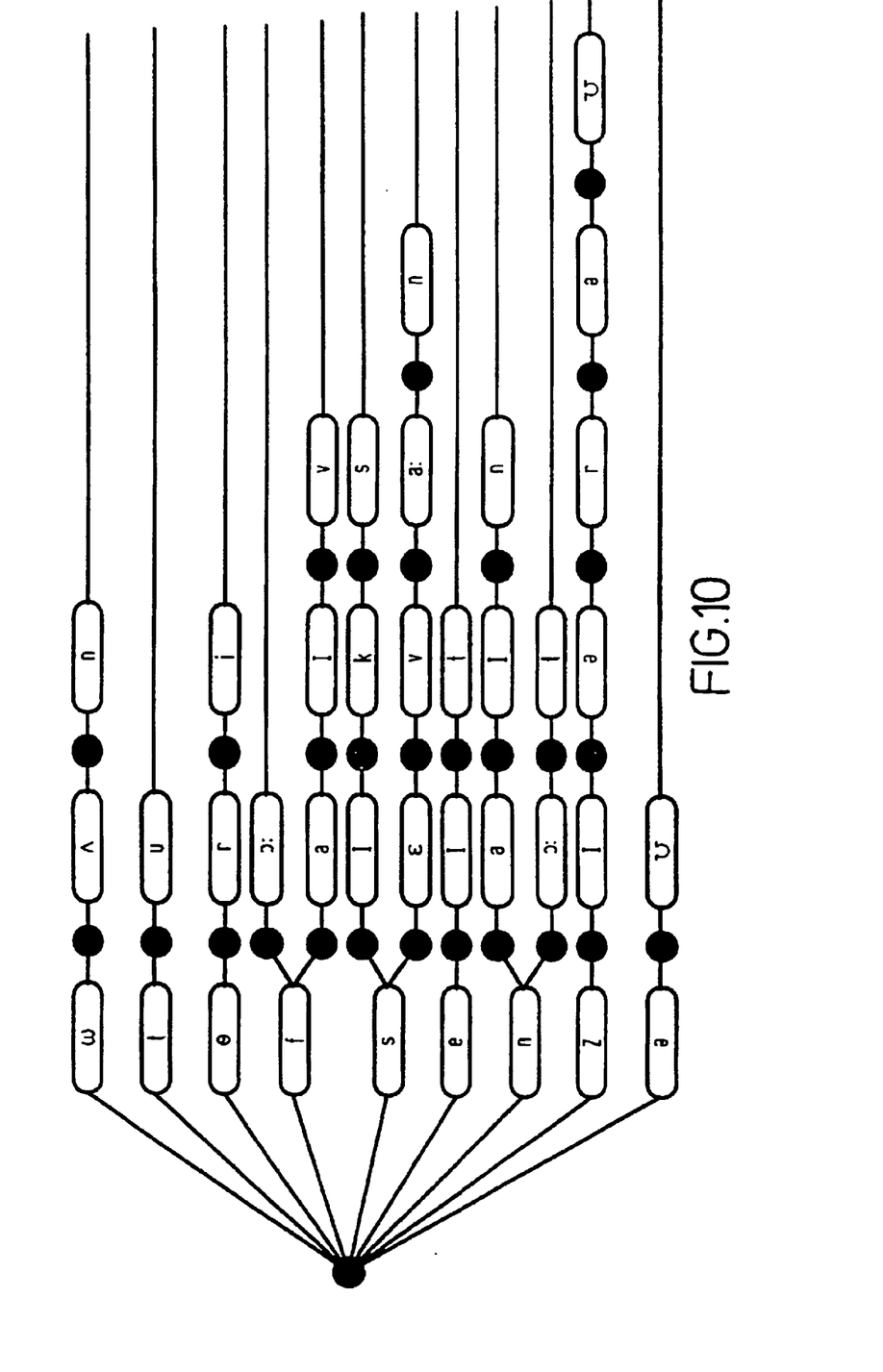
FIG. 10 shows a network for recognising the English words for the numbers 0 to 9.

The speech recogniser 10 is programmed with models to enable it to recognise spoken extension numbers. FIG. 10 shows a network of models for English numerals.

The operation of the apparatus of FIG. 9 will now be described. When a party places a call intended for one of the telephones 5a, 5b, 5c, the PABX 1 detects the ring signal on the subscriber line 2 and notifies the dialogue controller 11 that there is an incoming call. The dialogue controller 11 issues an off-hook command to the PABX which then places the subscriber line in the off-hook state. Immediately thereafter, the dialogue controller 11 issued commands to the speech synthesizer 12 causing it to generate the message "please state the extension number you require". The message signal from the speech synthesizer 12 is then applied to the subscriber line 2 by the PABX 1.

The ADC 8 repeatedly digitizes the signal arriving at the PABX 1 via the subscriber line 2 and outputs a digital signal to the digital signal processor 9. The digital signal processor 9 processes the digital signal and outputs vectors as described above.

After sending the command signals to the speech synthesizer 12, the dialogue controller 11 initialises the speech recogniser 10, causing it to instantiate instances of an initial set of models (w, t, θ, f, s, e, n, z, ə). Each of these models is added to a list of active models.

Once the message has been transmitted, the dialogue controller 11 instructs the speech recogniser 10 to monitor the output from the digital signal processor 9. The speech recogniser 10 takes no action until the vectors output by the digital signal processor 9 indicate that speech is being received. If no speech is received within a predetermined period, the dialogue controller 11 is notified by the speech recogniser and the message requesting an extension number is re-sent.

In the event that vectors suggestive of received speech are received, the speech recogniser 10 applies the vectors to the first set of model instances substantially as described above with reference to FIGS. 1 to 8. However, since a plurality of models are initially active, the first histogram is constructed in respect of the states of all of the model instances in the initial set. As a result, the number of active model instances, i.e. those in the list, is rapidly reduced. Similarly, the second histogram is built for the current exit tokens for all of the active model instances.

The effect of pruning is that the initial set of model instances will be removed from the list as soon as they are no longer playing a significant role in the recognition process. Furthermore, at any instant, succeeding model instances are only instantiated if the value of a exit token merits it.

The speech recogniser 10 monitors the exit tokens from instances of the right-hand model of each path through the network shown in FIG. 10 and when there are no longer any input speech vectors, it identifies the input spoken word as being that represented by the path through the network producing the best exit token values. Alternatively, each path through the network may be allocated a threshold value appropriate to the path length and the speech recogniser would identify the input spoken word with the network path producing an exit token with a largest percentage margin over its threshold.

If all of the models are removed from the list before a sufficiently large token emerges from the right-hand side of the network, the spoken word is deemed to be unrecognisable. If this occurs, the speech recogniser 10 notifies the dialogue controller 11 and the dialogue controller 11 commands the speech synthesiser 12 to output a message asking the caller to restate the extension number required.

If a positive recognition of the input spoken word is made, the speech recogniser 10 notifies the dialogue controller 11 of the number which it has determined had been said by the caller and the dialogue controller 11 sends control signals to the PABX 1 to cause the PABX 1 to route the incoming call to the appropriate telephone 5a, 5b, 5c.

Various modifications may be made to the apparatus as described above. For instance, the routing of signals through a switch 3 rather than a PABX 1 may be controlled by speech recognition apparatus substantially of the form described above. Furthermore, if the extension numbers consist of more than one digit, networks as shown in FIG. 9 could be cascaded or a calling party could be asked for the extension number digit by digit. In the case of the spoken number being recognised, the dialogue controller 11 could be arranged to cause the speech synthesiser 12 to echo the digit to the calling party for confirmation. In order to detect the confirmation, the dialogue controller 11 would reconfigure the speech recogniser 10 so that it would implement a network representing the words "yes" and "no".

In the event that one word to be recognised is an initial portion of another word to be recognised, for instance "seven" and "seventeen", the path through the network 4 (see FIG. 9) may include a number of instances of a model of the noise expected on a quiet telephone line.

Figure 11:
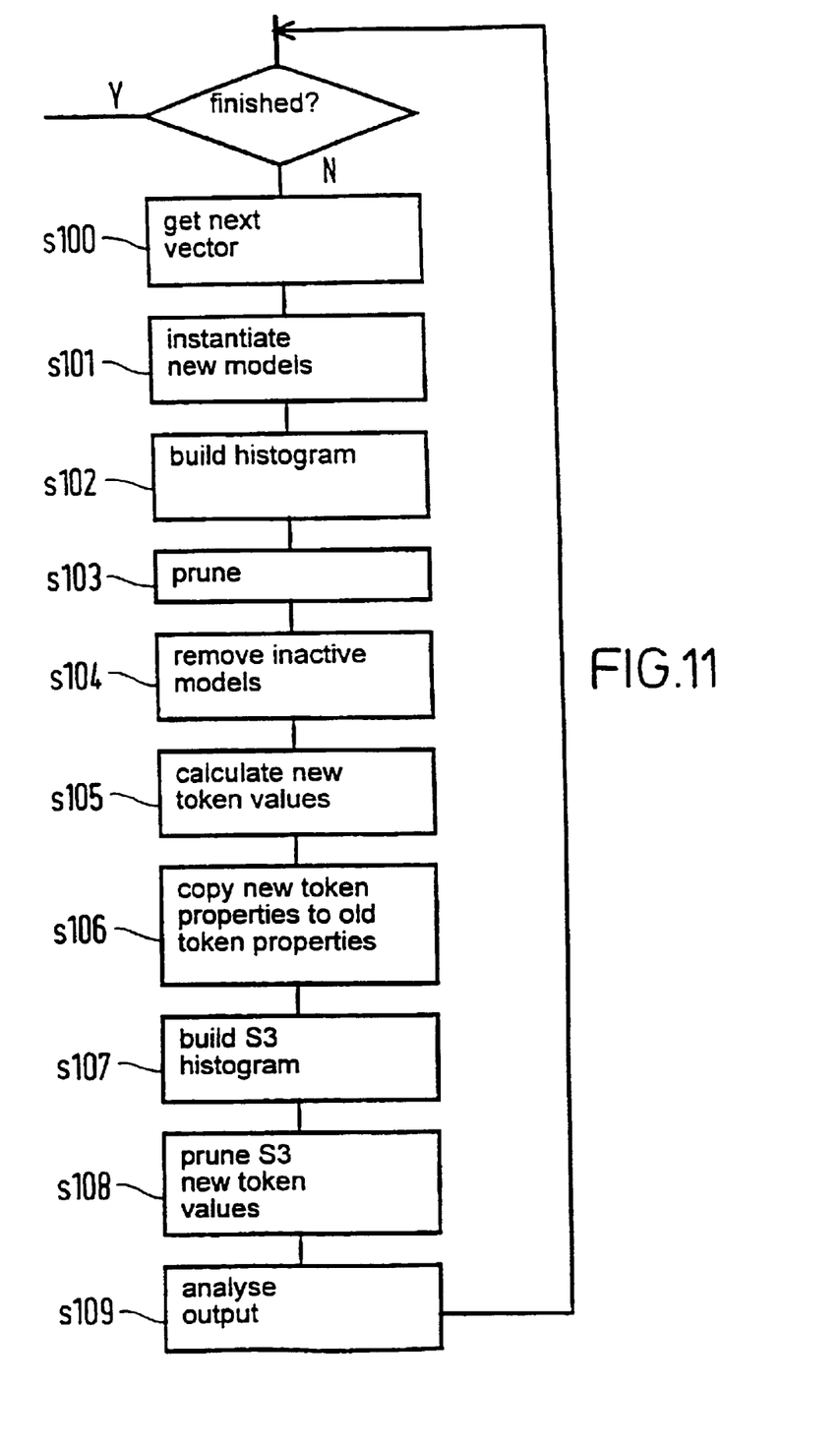
FIG. 11 us a flow diagram illustrating another method according to the present invention.

An alternative implementation of the network of FIG. 1 will now be described with reference to FIG. 11.

As described above, each of the models is implemented as an instance of a software model object including a one-dimensional array of state objects.

On initialisation, an instance of the k model is instantiated and added to a list of model instances. A loop is then entered, in which firstly the next input vector is obtained (step s100).

During the first iteration, the next input vector is of course the first input vector $V_0$. Next, the new token properties of all the $S_3$ states are inspected and a new model is instantiated for each $S_3$ state that has a non $-\infty$ new token property where the necessary model is not already in the list (step s101). The new models are added to the list of model instances. For instance, if the new token property for the $S_3$ state of the k model is greater than $-\infty$ and the list does not contain æ and a: models, new æ and a: models are instantiated. Of course, during the first two iterations no tokens will have reached the S3 state and no new models will be instantiated at this point.

A histogram of the old token properties for all states is then created (step s102). The histogram bins containing the five best non $-\infty$ old token properties are identified and the old token properties in other bins are set to (step s103). If there are less than six non old token properties, no old token properties will be set to $-\infty$. However, an absolute threshold may be applied in conjunction with the histogram so that old token properties below the threshold will be set to $-\infty$.

Any models in which the old token properties of all of the states are $-\infty$, except newly instantiated models, are then destroyed and removed from the list of active models (step s104). Destroyed models may subsequently be re-instantiated at step s101 if necessary.

The current input vector is applied to the models in the list and the tokens propagated (step s105). This comprises, for each of states $S_1$ to $S_3$ of each active model, identifying the states having links to the current state (including itself and possibly an $S_3$ state of a preceding model) that have old token properties greater than $-\infty$, multiplying the old token properties of the identified states by the respective link probability density function, selecting the largest of the token-link probability products and storing it in the new token property, and storing the result of multiplying the new token property by the product of the current input vector and the appropriate probability density function for the state in the new token property.

Once all of the new token properties have been calculated, the new token properties are copied to the respective old token properties (step s106). A histogram of the S3 state new token properties is then created (step s107). The histogram bins containing the three best S) state new token properties are identified and the S3 state new token properties in other bins are set to $-\infty$ (step s108). If there are less than four S3 state new token properties, no new state properties will be set to $-\infty$. However, an absolute threshold may be applied in conjunction with the histogram so that all S3 state new token properties that are below the threshold will be set to $-\infty$, even if they are in the bins containing the best $S_3$ state new token properties.

Tokens exiting the t and d model instances are analysed to determine whether the input vector sequence represented "cat", "card" or "can't" (step s109).

In another embodiment of a voice controlled apparatus for routing of calls to extensions and for which FIG. 9 is also applicable, the speech recogniser 10 processes the model shown in FIG. 10 in the manner described with reference to FIG. 11.

It is to be understood that the criterion for setting token properties to and preventing instantiation of models must generally be set empirically and that the examples given above are purely to aid the understanding of the invention. The skilled person working the present invention should not restrict his choice of criterion to those described herein but should determine criterion that produce a balance between accuracy of speech recognition and computational demands appropriate to his circumstances.

Although the present invention has been described with reference to embodiments in which a sub-word units are modelled. It will be appreciated that whole words may be modelled by a single hidden Markov model. However, the use of models of sub-word elements is particularly advantageous when a large vocabulary is to be recognised because it restricts the number of models that must be initially instantiated.

What is claimed is:

1. A method of recognising a pattern comprising a sequence of sub-patterns, the method comprising:
   a) generating a data sequence representative of a physical entity;
   b) applying the data sequence to a set comprising active models in a network of models including at least one model, wherein each model represents a sub-pattern and comprises a finite state network with a plurality of respective states,
   c) assessing each state of members of said set and deactivating those states that do not meet a predetermined first criterion, between the application of successive data elements;
   d) selecting a subset of the outputs of the members of said set according to a predetermined second criterion, and
   e) adding further models to said set in dependence on the members of said subset when said subset is selected, wherein each further model includes a plurality a respective states, the further models take at least one of the subset members as inputs, and each model represents a sub-pattern and in use outputs an indication of the degree of matching between an input data sub-sequence and the represented sub-pattern.

2. A method according to claim 1, wherein a further model is only added to said set if the set does not already contain that model.

3. A method according to claim 1, wherein the data sequence is applied to the network element-by-element and the selection of a subset of the outputs of the set of models is performed for each of successive applications of data sequence elements.

4. A method according to claim 1, wherein a model is removed from said set if all of its states have been deactivated.

5. A method according to claim 1, wherein the criterion applied to the model outputs is harsher than the criterion applied to states within models.

6. A method according to claim 1, wherein the application of the criterion applied to model outputs comprises creating a histogram of model outputs on the basis of their values and selecting those outputs in the bins of the histogram which contain the outputs having the best m values, wherein m is an integer.

7. A method according to claim 6, wherein model outputs are selected by setting output(s) that are not selected to a predetermined value.

8. A method according to claim 1, wherein the application of the criterion applied to all model states comprises creating a histogram of states on the basis of their values and selecting those states in the bins of the histogram which contain the states having the best n values, where n is an integer, for deactivation.

9. A method according to claim 1, wherein the pattern to be recognized is a speech pattern.

10. A method according to claim 9, wherein the models comprise models of subword vocalisations.

11. A method of generating a speech signal comprising performing a method according to claim 9, and operating a speech synthesizer in dependence on the result of performance of said method.

12. A method of operating a telephone switching centre comprising performing a method according to claim 9 and commanding a telephone switching centre for the purpose of establishing a telephone connection in dependence on the result of the performance of said method.

13. A method of operating a computer so as to recognise a pattern comprising a sequence of sub-patterns the method comprising:

generating a data sequence representative of a physical entity;

applying the data sequence to a set comprising active models in a network of models including at least one model, wherein each model represents a sub-pattern and comprises a finite state network with a plurality of respective states;

assessing each state of members of said set and deactivating those states that do not meet a predetermined first criterion, between the application of successive data elements;

selecting a subset of the outputs of the members of said set according to a predetermined second criterion; and adding further models to said set in dependence on the members of said subset when said subset is selected, wherein each further model includes a plurality a respective states, the further models take at least one of the subset members as inputs, and each model represents a sub-pattern and in use outputs an indication of the degree of matching between an input data sub-sequence and the represented sub-pattern.

14. A pattern recognition apparatus for recognising a pattern comprising a sequence of sub-patterns, the apparatus comprising:

means for generating a data sequence representative of a physical entity;

means for applying the data sequence to a set comprising active models in a network of models including at least one model, wherein each model represents a sub-pattern and comprises a finite state network with a plurality of respective states;

means for assessing each state of members of said set and deactivating those that do nor meet a predetermined first criterion, between the application of successive data elements;

means for selecting a subset of the outputs of the members of said set according to a predetermined second criterion; and means for adding further models to said set in dependence on the members of said subset when said subset is selected, wherein each further model includes a plurality a respective states, the further models take at least one of the subset members as inputs, and each model represents a sub-pattern and in use outputs an indication of the degree of matching between an input data sub-sequence and the represented sub-pattern.

15. An apparatus according to claim 14, wherein a further model is only added to said set if the set does not already contain that model.

16. An apparatus according to claim 14, wherein the data sequence is applied to the network element-by-element and the selection of a subset of the outputs of the first set of models is performed between the applications of successive data sequence elements.

17. An apparatus according to claim 14, wherein a model is removed from said set if all of its states have been deactivated.

18. An apparatus according to claim 14, wherein the criterion applied to the model outputs is harsher than the criterion applied to states within models.

19. An apparatus according to claim 14, wherein the pattern to be recognized is a speech pattern.

20. An apparatus according to claim 19, wherein the models comprise models of sub-word vocalisations.

21. An apparatus for generating speech signal comprising an apparatus according to claim 19, and a speech synthesizer configured for operation in dependence on the operation of the speech recognition apparatus.

22. A telephone network apparatus comprising an apparatus according to claim 19 and a telephone switching centre, wherein the telephone switching centre operates to establish a telephone connection in dependence on the operation of the pattern recognition apparatus.

* * * * *